Figures 1, 2, 3:
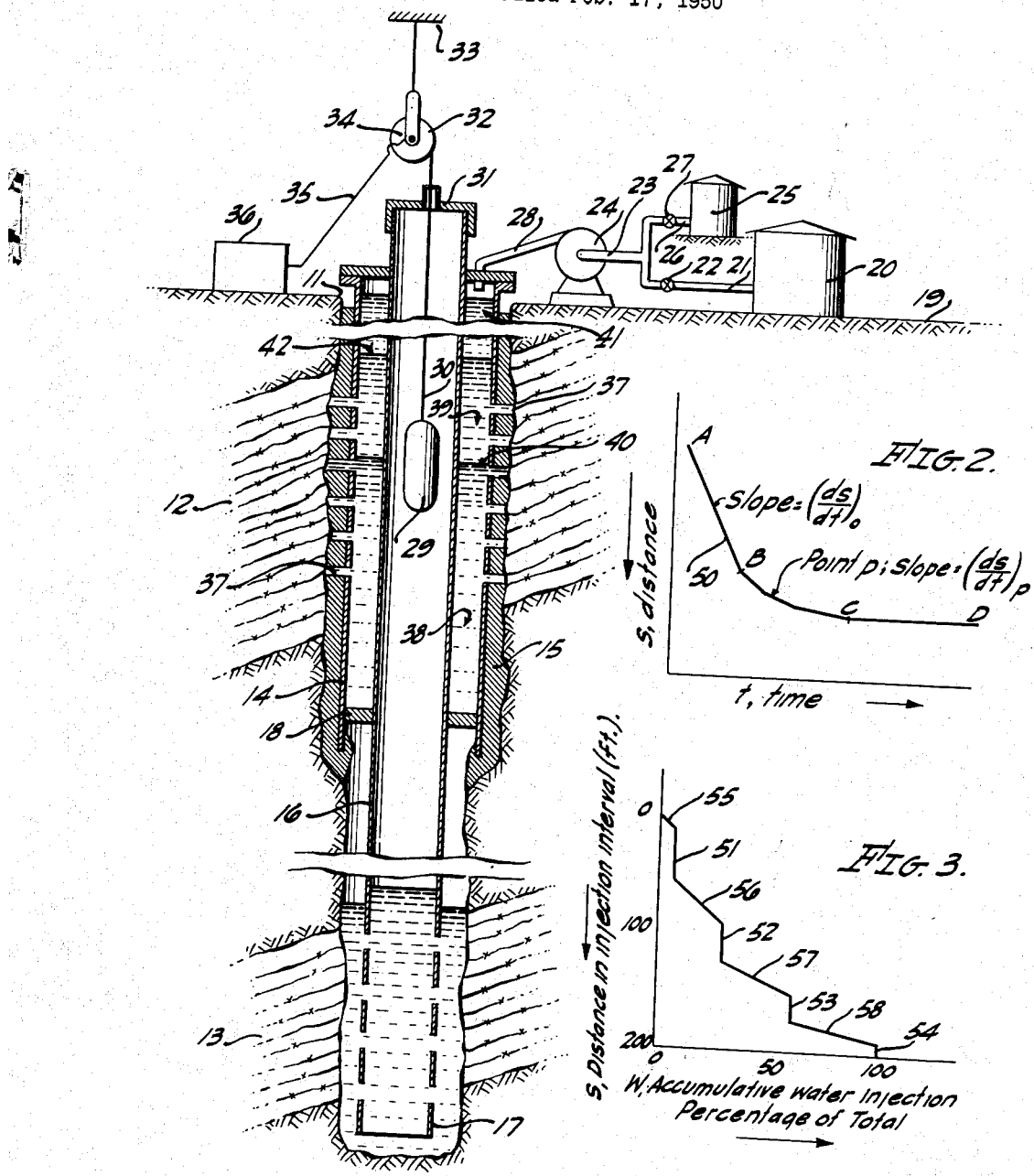

Aug. 4, 1953

M. G. ARTHUR 2,648,014

MEASUREMENT OF INJECTION PROFILES

Filed Feb. 17, 1950

INVENTOR.
MILAN G. ARTHUR,
BY Ross J. Garofalo
ATTORNEY.

Patented Aug. 4, 1953

2,648,014

UNITED STATES PATENT OFFICE 2,648,014

MEASUREMENT OF INJECTION PROFILES

Milan G. Arthur, Whittier, Calif., assignor to Union Oil Company of California, Los Angeles, Calif., a corporation of California Application February 17, 1950, Serial No. 144,682

21 Claims. (Cl. 250—83.6)

This invention relates generally to the measurement of fluid flow into earth formations and more particularly relates to the measurement of the injection profile of an earth formation wherein the relative differential injection into each vertical increment of such formation is measured.

The use of secondary recovery measures such as water flooding, gas drive and the like is of widespread application at the present time. In order to exploit such recovery methods to the utmost it is desirable to determine the relative injection rate of each consecutive layer of earth formation.

Often in the development of a well bore a casing is run through a number of formations and is cemented into place whereby a layer of cement binds the pipe to the surrounding earth formation at all points. When it is later desired to produce oil from a cemented off formation, or to inject water or other fluids into such formation, the casing and cement barrier are perforated by any well known method of perforating. Often such perforations are partially or wholly ineffectual in piercing both barriers and exposing the free formation. In such cases an injection profile gives an indication of the effectiveness of the various perforations over the interval. In other cases where a formation has neither been cemented off nor cased and the bare formation is exposed, it is desirable to know which of the exposed formations is taking injection water and in what amounts.

In the past one method for estimating the water injection profile of a formation undergoing water flooding has been to interrupt the flow of water into the injection well, e. g. fresh water, and to substitute therefor water of different electrical properties, e. g. salt water. The flow of water down the well bore and into the formation was then followed by placing a conductivity cell in the well bore and running it back and forth through the boundary between the fresh and salt water and thereby determining the downward water velocity. As a result of the movement of the cell or other such instrument through the boundary, a considerable mixing occurs with the result that the otherwise sharp line of demarcation between the two phases is obliterated with a corresponding decrease in the accuracy of the measurements. Furthermore, the changes in viscosity of the injection liquid, the differences in density of the two fluids, the effect on the formation of substituting brine for fresh water, or fresh water for brine, are indeterminate variables which probably change the nature of the injection and cast much doubt upon the significance of the method and the results obtained thereby.

It is an object of this invention to measure fluid flow into an earth formation by an improved method wherein accurate measurements can be made.

It is another object of this invention to follow the movement of the interfacial boundary existing between two layers of miscible liquids, the one liquid containing dissolved radioactive constituents, wherein the following is accomplished with a minimum disturbance and mixing of the two liquids at the boundary.

It is another object of this invention to interpose a column of radioactivity containing water between two moving columns of water not containing radioactivity within a well bore and to follow the movement of such radioactive column past an injection zone in order to determine the fluid velocity from which the injection profile of such injection zone can be estimated.

It is another object of this invention to interrupt the flow of injection water into a well bore, to place a section of radioactive compound-containing water in such well bore, and to follow the downward velocity of the boundary between the water and the radioactivity-containing water by means of a radiation detector, which radiation detector is out of physical contact with the moving column of water.

Briefly this invention relates to the measurement of injection profiles wherein an inner pipe is placed within the well bore, which well bore may or may not be wholly or partly cased. The inner pipe is normally fitted so as to prevent leakage of injection fluids thereinto and such fitting may be simply a cap, or in another modification it may comprise an outside packing between the inner pipe and either the earthen or rock well bore wall or the casing with the packer being situated below the injection zone. Injection water, which may be fresh water or more commonly oil field brine, is pumped into the annular space surrounding the inner pipe and flows under pressure into the formations making up the injection zone. When the water injection has been continued for a sufficient period of time to establish a steady state of injection, the flow of injection water is stopped and a radioactivity-containing water is pumped into the annular space at substantially the same flow rate as the regular injection water had previously been pumped thereinto. After a period of time the flow of radioactivity-containing water is stopped and the flow of regular injection water is thereafter resumed.

A Geiger-Müller counter or other suitable radiation indicating and measuring means is inserted into the inner pipe and is moved downwardly with the downward flow of the interfacial boundary between the water and the radioactivity-containing water, the boundary being located by a sharp change in the radiation which is observed when the Geiger-Müller counter is moved past the boundary. The injection of water at the earth surface is continued and flows into the formation at the injection zone. The vertical descent of the boundary is relatively uniform until the injection zone is reached whereupon the downward velocity of the boundary gradually and usually irregularly decreases and finally becomes zero at the lower end of the injection zone at which point there is no net downward movement. The deceleration of the downward movement of the interfacial boundary is caused by the continuous or step-wise withdrawal of fluid from the column by the surrounding formation. Where the area of the annular space is known, such deceleration can be employed to determine the flow rates into each of the different layers of earth strata.

Attached Figure 1 shows one modification of the invention for determining the injection profile of an upper injection formation in a well bore which is normally employed to produce oil from a lower oil-bearing zone through the inner pipe and water is injected into the annular space between such inner pipe and out a perforated casing.

Attached Figure 2 shows a typical plot of the vertical height of the boundary in the well bore with time.

Attached Figure 3 shows a typical plot of the accumulated injection water expressed as the percent of the total with respect to the vertical distance interval of the injection zone.

Referring now more particularly to Figure 1, well bore 11 has been completed through various formations including formation 12 undergoing water injection and formation 13 which is producing oil. In completing well bore 11 casing 14 is cemented into place with cement barrier 15 which normally seals the exposed formation. Below the lower end of casing 14 bore hole 11 has been completed to oil-bearing formation 13 and below casing 14 bore hole 11 is uncased. Inner pipe 16 passes from the earth surface coaxially through casing 14 to oil-bearing formation 13 where it is fitted with a suitable liner 17 for producing oil from oil-bearing formation 13. Below the injection zone the annular space between casing 14 and inner pipe 16 is fitted with a packer 18 which prevents leakage of water from the upper annular space.

At the earth surface 19 is located a water storage tank 20 which empties through line 21, valve 22 and line 23 into the intake of pump 24 which is usually a high pressure, positive displacement pump. Also located at the earth surface is tank 25 for discharging water containing dissolved radioactive salts through line 26 and valve 27 into line 23 and then into the intake of pump 24. Pump 24 discharges through discharge line 28 into the annular space between inner pipe 16 and casing 14. Geiger-Müller counter 29 or other such suitable radiation indicating means is suspended within inner pipe 16 by supporting cable 30 which passes upwardly through the inner pipe 16 and out of a suitable closure 31 to a winding 32 which is in turn suitably supported by support 33. In another variation, not shown, the winding drum 32 may be located near the ground surface to the side of the well bore and cable 30 is passed from the drum over a suitable sheave and down into the bore hole. Winding drum 32 is fitted with depth of instrument indicating means not shown. Winding drum 32 is also fitted with commutators 34 for receiving electrical energy from Geiger-Müller counter 29 transmitted upwardly through insulated conducting cable 30. Commutators 34 are attached by suitable leads 35 to recording-indicating means 36.

In the operation of the equipment, water from tank 20 is discharged through pump 24 into the annular space, such water being removed from the annular space by passage through numerous perforations 37 which pierce casing 14 and cement barrier 15 and pass into earth formation 12. Such perforations have been produced by knife perforating, gun perforating, jet perforating or the like. The hydrostatic head of the column of injection water 38 plus the discharge pressure of the pump 24 forces the water into formation 12. After the flow of the injection water from tank 20 has continued for some time it is then stopped by closing valve 22 and simultaneously the discharge of tank 25 containing radioactivity-containing solution is commenced by opening valve 27. Tank 25 is thereby discharged through pump 24 into the annular space where a layer of radioactivity-containing water 39 is created which rests on the top of injection water body 38 and is separated from water body 38 by interfacial boundary 40. After tank 25 has been discharged for a suitable period of time valve 27 is closed and valve 22 is opened thereby discontinuing the discharge of tank 25 and resuming the discharge of tank 20. Under such conditions a body of non-radioactivity water 41 is created which rests on radioactivity-containing water 39 and is separated therefrom by interfacial boundary 42.

During the foregoing operations interfacial boundary 40 slowly descends in the annular space and its arrival at any particular level is determined by positioning Geiger-Müller counter 29 within inner tube 16 at such level and noting the time of the sharp increase in the amount of radiation striking Geiger-Müller counter 29. Alternatively Geiger-Müller counter 29 is moved up and down in the inner pipe 16 and is stopped at the point where there is a sharp change of radiation and the level and time recorded. The velocity of interfacial boundary 40 is followed by this means throughout the entire injection interval and the downward velocity finally drops to zero at or near the bottom of the injection interval. By substantially the same methods the downward movement of upper interfacial boundary 42 can be followed and may be employed to check the accuracy of the data obtained with the lower interfacial boundary 40.

Referring now more particularly to attached Figure 2, the data obtained by following the path of either the lower or the upper interfacial boundary, 40 or 42, respectively, are plotted to obtain a distance-time curve of the general type shown in Figure 2 by curve 50. Curve 50 is composed of three distinct portions; the first section AB is linear and represents the downward path of the boundary above the injection zone where there is no lateral diversion of the fluid stream; the second section BC may be curvilinear or may be made up of a series of linear sections, each with successively different slopes and section BC represents a series of changes of the rate of descent corresponding to either continuous or successive lateral diversions of the fluid stream into the injection zone; and the third section CD is a flat linear section corresponding to the absence of further downward movement of the radioactive stream and representing the condition which prevails when the boundary reaches the bottom of the injection interval.

Throughout the injection interval the downward fluid velocity in the annular space is given at any point by the derivative $$\frac{ds}{dt}$$

which is the derivative of the distance $(s)$ with respect to time $(t)$. Normally the cross-sectional area $(A)$ of the annular space is known or can be calculated but in some cases the area of the annular space must be separately determined. The rate of fluid flow at any particular point, e. g. at some point $n$, is given by the product $$A_n \left(\frac{ds}{dt}\right)_n$$

wherein $A_n$ is the annular area at the point $n$ and $$\left(\frac{ds}{dt}\right)_n$$

is the downward fluid velocity at the point $n$. Over any distance interval $(\Delta s)$ between any two points $m$ and $n$ the lateral diversion of a part of the stream into the surrounding formation is numerically equal to the difference between the rate of flow at the beginning of such interval and the rate of flow at the end of such interval according to the expression $$A_m \left(\frac{ds}{dt}\right)_m - A_n \left(\frac{ds}{dt}\right)_n$$

In the particular modification shown in Figure 1 the annular area throughout the injection interval is constant. Hence $$A = A_m = A_n$$

Furthermore, it is usually desirable to plot the accumulated injection water throughout the injection interval. At the beginning of the interval the flow rate is the same as that represented by section AB of curve 50 in Figure 3 and is therefore numerically determined by the expression $$A \left(\frac{ds}{dt}\right)_o$$

wherein $(A)$ is the cross-sectional annular area and $$\left(\frac{ds}{dt}\right)_o$$

is the numerical value of the slope of section AB of curve 50. The total water injection at point $(p)$ with respect to initial injection point B as a reference is represented by $$A \left[ \left(\frac{ds}{dt}\right)_o - \left(\frac{ds}{dt}\right)_p \right]$$

By dividing the foregoing expression for the total injection rate prior to point $p$ by the total injection for the entire interval, there is obtained the percentage of the total water injection (W) which has been injected at point $p$.

$$W = \frac{\left(\frac{ds}{dt}\right)_o - \left(\frac{ds}{dt}\right)_p}{\left(\frac{ds}{dt}\right)_o}$$

When the accumulative water injection W is plotted against the distance interval there is obtained a curve of the type shown in Figure 3.

Referring now more particularly to attached Figure 3, the accumulated water injection (W) expressed as the percentage of the total is plotted against the distance $(s)$ throughout the injection interval. A series of four vertical distance increments 51, 52, 53 and 54 respectively are obtained corresponding to an absence of injection during such distance increments while a series of four non-vertical sections are obtained, 55, 56, 57 and 58 respectively, the slope in such intervals with respect to the vertical being proportional to the average relative water injection over the particular distance increment.

In many cases an inner pipe is already in the bore hole which can serve as a passageway for the radiation detector out of contact with the injection fluid. Such was the case in the modification shown in Figure 1 wherein the oil flow line was used as the inner pipe after removal of the sucker rods, etc. In other cases a special inner pipe for carrying the radiation detector is suitably inserted into the well bore and is preferably sealed at the lower end to prevent fluid loss from the annular space. In such an arrangement the operation of the invention is effected substantially in the same manner as has been described hereinabove except that in this latter case no rod and tubing need be removed from the pipe. Where sufficiently small radiation detector is employed, it is not even necessary to remove the rods, etc. In one modification of the invention a long pipe capped on the lower end is inserted into the well bore and the Geiger-Müller counter is merely run up and down the inside of the capped pipe.

A number of radioactivity-containing solutions may be employed in this invention. It is preferable that the general composition of the radioactivity solution should approximate the composition of the ordinary injection water in order that there is no change in the injection rate resulting from chemical or physical changes produced in the formation by the injection of the radioactivity solution. Therefore the radioactivity solution will preferably be an aqueous solution of about the same ionic strength as the injection water such as might be prepared by adding a concentrated solution of a radioactive water-soluble salt to an aliquot of the ordinary injection water.

The general requirements for the radioactivity solution are that the radioactive salt be water-soluble in the amount employed and that the injection rate be not appreciably altered by the injection of radioactivity solution. The radioactivity-containing solution should be a gamma-ray emitter.

Water-soluble salts of any of the radio-elements may be employed such as any of the following radio-elements: Iodine[131], bromine[82], cobalt[60], gallium[72], lanthanum[140], molybdenum[99], osmium[191], potassium[42], praseodymium[142], sodium[24], wolfram[187], zinc[65], and zinc[69]. Radioiodine or bromine may for example be employed as ammonium or alkali metal iodides or bromides etc., while the other radio-elements are generally employed as nitrates, chlorides, acetates, sulfates, bromates etc. Other such water-soluble salts may be employed similarly. It is preferable that the radioactive element exist in the anion of the salt in order to prevent and/or minimize removal of activity by exchange with clays. The preferred radioactive salt is $KBr^{82}$. Preferably a larger amount of an inert carrier salt is employed to dilute the physical and chemical effects of the active salt and minimize and/or prevent the selective removal of the radio-element from the solution by any physical or chemical process, e. g. ion exchange in the bore hole. Thus, inactive potassium bromide may be employed with either $KBr^{82}$ or $K^{42}Br$; inert sodium iodide may be employed with either $NaI^{131}$ or $Na^{24}I$; inactive cerous chloride $CeCl_3$ may be employed to dilute the chemically similar $Pr^{142}Cl_3$ or $La^{140}Cl_3$; and zinc acetate may be employed to dilute $Zn^{65}(C_2H_3O_2)_2$ or $Zn^{69}(C_2H_3O_2)_2$.

Perhaps the process of this invention can best be understood by reference to the following specific example:

Example

In an apparatus corresponding to that described in Figure 1 a radioactive solution of potassium bromide containing 200 g. of inactive potassium bromide and 0.5 g. of active potassium bromide in 12 barrels of water was prepared. The active potassium bromide $KBr^{82}$ was purchased from the Atomic Energy Commission. In the particular injection well the annular space had a cross-sectional area of 25.5 sq. in. The normal injection rate was 150 barrels per day. The radioactive potassium bromide solution was interposed between two columns of ordinary injection water and the interfacial boundary was followed down the well bore by means of the Geiger-Müller counter of the type customarily employed in the well known gamma ray well logging procedure. In the annular section above the injection interval the boundary descended at the rate of about 3.3 ft./min. The derivative $$\left(\frac{ds}{dt}\right)_o$$

was therefore 3.3 ft./min. The Geiger-Müller counter was employed to follow first the lower boundary until such boundary became stopped at the bottom of the injection interval and thereafter to follow the upper boundary. The deceleration of each boundary was separately employed to determine from curves of the type shown in Figure 2 and Figure 3 from which the injection profile of the interval was determined as described hereinbefore.

The term "wall" in connection with a well is used in the following claims to denote either the casing of a cased bored hole or the earthen rock wall of an uncased hole.

It is apparent that many modifications of this invention may be made by those skilled in the art without departing from the spirit and scope of the following claims.

I claim:

1. A method for determining the injection profile of an injection zone of a well which comprises injecting a first body of water into the annular space between an inner pipe and the wall of said well, injecting a second body of water containing a dissolved radioactive salt into said annular space and forming an interfacial boundary between said first body of water and said second body of water, causing said first and said second bodies of water to flow downwardly through said annular space and into said injection zone and following the downward movement of said interfacial boundary by means of a radiation detector located within said inner pipe.

2. A method according to claim 1 wherein said water-soluble salt is an inorganic salt having a radioactive atom in the anion of said salt.

3. A method according to claim 1 wherein said water-soluble salt is an inorganic salt having a radioactive atom in the anion of said salt and an inactive carrier salt of a chemically similar structure is employed therewith.

4. A method according to claim 1 wherein said radioactive salt is potassium bromide containing $bromine^{82}$.

5. A method for determining the injection profile of an injection zone of a well which comprises inserting an inner pipe in said well, injecting a first body of water into the annular space between said inner pipe and the wall of said well, injecting a second body of water containing a dissolved radioactive salt into said annular space and forming an interfacial boundary between said first body of water and said second body of water, causing said first and said second bodies of water to flow downwardly through said annular space and into said injection zone and following the downward movement of said interfacial boundary by means of a radiation detector located within said inner pipe.

6. A method according to claim 5 wherein said water-soluble salt is an inorganic salt having a radioactive atom in the anion of said salt.

7. A method according to claim 5 wherein said water-soluble salt is an inorganic salt having a radioactive atom in the anion of said salt and an inactive carrier salt of a chemically similar structure is employed therewith.

8. A method according to claim 5 wherein said radioactive salt is potassium bromide containing $bromine^{82}$.

9. A method for determining the injection profile of an injection zone of a well which includes the steps of injecting a first body of water into the annular space between an inner pipe and the wall of said well, injecting a second body of water containing a dissolved radioactive salt into said annular space and forming a first interfacial boundary between said first body of water and said second body of water, injecting a third body of water into said annular space and forming a second interfacial boundary between said second and said third bodies of water, causing said first and said second and said third bodies of water to flow downwardly through said annular space and into said injection zone and following the downward movements of said first interface and of said second interface by detecting sharp changes in radiation within said inner pipe.

10. A method according to claim 9 wherein said water-soluble salt is an inorganic salt having a radioactive atom in the anion of said salt.

11. A method according to claim 9 wherein said water-soluble salt is an inorganic salt having a radioactive atom in the anion of said salt and an inactive carrier salt of a chemically similar structure is employed therewith.

12. A method according to claim 9 wherein said radioactive salt is potassium bromide containing $bromine^{82}$.

13. A method for determining the injection profile of an injection zone of a well which includes the steps of inserting an inner pipe in said well, injecting a first body of water into the annular space between said inner pipe and the wall of said well, injecting a second body of water containing a dissolved radioactive salt into said annular space and forming a first interfacial boundary between said first body of water and said second body of water, injecting a third body of water into said annular space and forming a second interfacial boundary between said second and said third bodies of water, causing said first and said second and said third bodies of water to flow downwardly through said annular space and into said injection zone and following the downward movements of said first interface and of said second interface by detecting sharp changes in radiation within said inner pipe.

14. A method according to claim 13 wherein said water-soluble salt is an inorganic salt having a radioactive atom in the anion of said salt.

15. A method according to claim 13 wherein said water-soluble salt is an inorganic salt having a radioactive atom in the anion of said salt and an inactive carrier salt of a chemically similar structure is employed therewith.

16. A method according to claim 13 wherein said radioactive salt is potassium bromide containing bromine[82].

17. A method for determining the injection profile of an injection zone of a well which comprises injecting a first body of water into the annular space between an inner pipe and the wall of said well, injecting a second body of water containing a dissolved radioactive salt into said annular space and forming an interfacial boundary between said first body of water and said second body of water, causing said first and said second bodies of water to flow downwardly through said annular space and into said injection zone, determining the downward velocity of said interface throughout said injection zone by detecting the movement of break in the intensity of the radiation within the inner pipe along the axis of said pipe and dividing the algebraic difference between the velocity at the start of said injection interval and the velocity at an intermediate level of said interval by the initial velocity in order to obtain the accumulated water injection at said intermediate level expressed as the percent of the total water injected.

18. A method for determining the injection profile of an injection zone of a well which comprises injecting a first body of water into the annular space between an inner pipe and the wall of said well, injecting a second body of water containing a dissolved radioactive salt into said annular space and forming an interfacial boundary between said first body of water and said second body of water, causing said first and said second bodies of water to flow downwardly through said annular space and into said injection zone, following the downward movement of said interfacial boundary by means of a radiation indicator and detecting the deceleration of said interfacial boundary as a measurement of the flow of injection water laterally from said well within said injection zone.

19. A method for determining the injection profile of an injection zone of a well which includes the steps of injecting a first body of water into the annular space between an inner pipe and the wall of said well, injecting a second body of water containing a dissolved radioactive salt into said annular space and forming a first interfacial boundary between said first body of water and said second body of water, injecting a third body of water into said annular space and forming a second interfacial boundary between said second and said third bodies of water, causing said first and said second and said third bodies of water to flow downwardly through said annular space and into said injection zone and following the downward movement of said first interface through said injection zone by detecting the change in radiation within said inner pipe thereby measuring the deceleration of said first interface as a measure of flow of injection water laterally throughout the length of said injection zone, subsequently following the downward movement of said second interface and measuring its deceleration as a check determination of said lateral flow of injection water to establish said injection profile.

20. A method for determination of the liquid injection profile of an injection zone of known cross-sectional area in a well bore penetrating permeable underground strata into which a liquid is injected which comprises injecting a first body of liquid into the annular space between an inner pipe and the well bore wall, following said first body with a second body of liquid containing a dissolved radioactive material forming a first interfacial boundary therebetween, following said second body of liquid forming a second interfacial boundary therebetween, causing said bodies of liquid to flow downwardly through said annular space into said injection zone, measuring the downward movements of said interfacial boundaries by detecting sharp changes in radiation intensity within said inner pipe, measuring the decrease in velocity of said first interfacial boundary with distance through said injection zone of known cross section as a measure of lateral fluid flow therefrom into said permeable strata to determine said injection profile and then measuring the decrease in velocity of said second interfacial boundary with distance through said injection zone as a check determination of said lateral flow of fluid.

21. A process for determining the liquid injection profile of an injection well in secondary recovery operations wherein an injection liquid is continuously introduced through a well bore into underground permeable strata penetrated thereby which comprises stopping the flow of said injection liquid, introducing a radioactive substance-containing liquid at substantially the same rate forming an interfacial boundary between the latter liquid and said injection liquid, stopping the flow of said radioactive liquid and continuing the injection liquid introduction forming a second interfacial boundary, following the downward movement of at least one of said interfacial boundaries by means of a radiation detector movable within a pipe extending through said injection zone and detecting the deceleration of said interfacial boundary with distance through said injection zone as a measure of lateral flow of liquid therefrom into said permeable strata thereby determining said injection profile.

MILAN G. ARTHUR.

References Cited in the file of this patent

UNITED STATES PATENTS

| Number | Name | Date |
|---|---|---|
| 2,453,456 | Piety | Nov. 9, 1948 |
| 2,456,233 | Wolf | Dec. 14, 1948 |
| 2,540,049 | Hinson | Jan. 30, 1951 |